United States Patent [19]

Kumasaka et al.

[11] Patent Number: 4,517,312

[45] Date of Patent: May 14, 1985

[54] PROCESS FOR REGENERATING RESIN

[75] Inventors: Sadao Kumasaka; Satomi Tada, both of Tokyo; Shigeo Horikoshi; Tamaki Kamanaka, both of Kawagoe; Hiroshi Taniguchi, Tokyo, all of Japan

[73] Assignee: Toyo Rubber Chemical Industry Co., Ltd., Tokyo, Japan

[21] Appl. No.: 563,644

[22] Filed: Dec. 19, 1983

[30] Foreign Application Priority Data

Dec. 23, 1982 [JP]  Japan ................................ 57-229202

[51] Int. Cl.$^3$ ............................................. C08J 11/04
[52] U.S. Cl. ........................................ 521/47; 521/40; 521/40.5; 521/45; 521/46; 521/48
[58] Field of Search ................... 521/47, 45, 40, 40.5, 521/46, 48

[56] References Cited

U.S. PATENT DOCUMENTS

| | | | |
|---|---|---|---|
| 3,427,370 | 2/1969 | Schnell et al. | 521/40 |
| 3,696,058 | 10/1972 | Teti | 521/40 |
| 4,104,341 | 8/1978 | Keppler et al. | 521/47 |
| 4,196,105 | 4/1980 | Kuhn et al. | 521/47 |

FOREIGN PATENT DOCUMENTS

| | | | |
|---|---|---|---|
| 617788 | 4/1961 | Canada | 521/47 |
| 2535502 | 2/1976 | Fed. Rep. of Germany | 521/47 |
| 50-158673 | 12/1975 | Japan | 521/47 |
| 54-3172 | 1/1979 | Japan | 521/47 |

Primary Examiner—Allan M. Lieberman
Attorney, Agent, or Firm—Frishauf, Holtz, Goodman & Woodward

[57] ABSTRACT

A process for regenerating a resin, comprises the steps of dissolving a waste resin in an organic solvent to provide a resin solution, mixing the resin solution with a liquid of normal temperature, the liquid being immiscible with the solvent, scarcely dissolving the resin, and having a specific gravity smaller than that of the solvent and larger than that of the resin, thereby separating the resin from a mixture of the resin solution and the liquid, and recovering the resin. The liquid may have a temperature higher than the boiling point of the solvent. In this case, the solvent evaporation takes place together with the resin separation. The evaporated solvent is cooled later for recovery of the solvent.

3 Claims, No Drawings

PROCESS FOR REGENERATING RESIN

BACKGROUND OF THE INVENTION

The present invention relates to a process for regenerating a resin and, more particularly, to a process for regenerating and recovering a resin by reprocessing a waste resin product.

Resins are indispensable materials in contemporary life, and various resin or plastic products such as molded products or foamed products of natural or synthetic resins are being manufactured. However, these resins are almost never decomposed by microorganisms. When such resins are burnt, they often generate toxic gases which may corrode the furnace. For this reason, the processing of waste resin products has become a serious problem. Some attempts at regenerating a resin from waste resin products have been proposed. For a polystyrene resin or the like, a method has been proposed wherein a waste polystyrene resin is burnt to be gasified and the gasified resin is separated to allow recovery of the resin. However, as may be apparent from this example, a process for reprocessing a waste resin and regenerating a resin therefrom requires a considerable investment in facilities and a high running cost. This process also results in a high energy consumption, and has therefore not been frequently adopted in practice.

If a process for reprocessing a waste resin to regenerate a resin at low cost and with ease can be proposed, such a process will contribute much to the quality of life, i.e., will provide a solution to the pollution of industrial waste and allow conservation of limited resources.

SUMMARY OF THE INVENTION

The present invention has been made in consideration of this and has for its object to provide a process for regenerating a resin from a waste resin at low cost and with ease, without requiring a considerable investment in facilities or a high running cost.

According to an aspect of the present invention, there is provided a process for regenerating a resin, comprising the steps of dissolving a waste resin in an organic solvent to provide a resin solution; mixing the resin solution with a liquid of normal temperature, said liquid being immiscible with said solvent, scarcely dissolving said resin, and having a specific gravity smaller than that of said solvent and larger than that of said resin, thereby separating said resin from a mixture of said resin solution and said liquid; and recovering said resin.

According to another aspect of the present invention there is provided a process for regenerating a resin, comprising the steps of dissolving a waste resin in an organic solvent to provide a resin solution; bringing the resin solution into contact with a liquid of a temperature higher than the boiling point of said organic solvent, said liquid being immiscible with said solvent, scarcely dissolving said resin and having a specific gravity smaller than that of said solvent and larger than that of said resin, thereby separating said resin from a mixture of said resin solution and said liquid; and recovering said resin. The temperature of the liquid is preferably 50° C. to 85° C.

DETAILED DESCRIPTION OF THE PREFERRED EMBODIMENT

A waste resin to be used herein may be a waste of any type of resin as long as there exists an organic solvent capable of dissolving the resin. For example, the waste resin may be a nonfoamed, molded waste resin product or a foamed waste resin product such as a polystyrene foam box for fish or vegetable. Furthermore, flashes or defective resin products produced at factories as subproducts may be similarly used in accordance with the present invention.

An organic solvent for dissolving a waste resin therein to prepare a resin solution may be any type of solvent as long as it is capable of dissolving the target resin. However, from the viewpoint of ease in working, an organic solvent having a satisfactory dissolving power at room temperature is preferable. Organic solvents having specific gravities larger than that of water such as methylene chloride, trichloroethylene or carbon tetrachloride are preferably used. According to the process of the present invention, the waste resin is dissolved in such a solvent to prepare a resin solution.

A liquid to be mixed with the resin solution according to the process of the present invention is preferably water.

In order to mix the resin solution with the liquid, the resin solution may be poured into the liquid, or the liquid may be poured into the resin solution. When the resin solution and the liquid are mixed together, the resin precipitates from the resin solution at the interface between the resin solution and the liquid. The resin separated from the resin solution in this manner is purified compared with the original waste resin product for the following reason. First, inorganic materials in the waste resin cannot be dissolved in an organic solvent and can therefore be removed from the solution system when the resin solution is prepared. Low-molecular weight organic compounds contained in the waste resin have a higher solubility in a solvent than does the resin. For this reason, such low-molecular weight organic compounds mostly remain dissolved in the resin solution when the resin precipitates therefrom. Thus, the solute resin precipitates as a purified resin. When the resin solution and the liquid are mixed, they are preferably agitated to increase the contact area therebetween and to facilitate precipitation of the solute resin.

When the solute resin precipitates from the resin solution in this manner, the resin floats at the surface of the liquid while the solvent precipitates below the liquid, which is immiscible with the solvent, due to the difference in the specific gravities. Since the precipitated and regenerated resin and the solvent are completely separated by the liquid, the floating resin can be completely recovered without becoming re-dissolved in the solvent. Furthermore, since the solvent is completely separated from the resin and precipitates below the liquid, it can be directly reused.

Where the liquid has a temperature higher than the boiling point of the solvent, the resin can be sufficiently separated by simply pouring the resin solution into the liquid; the resin solution-liquid mixture need not be stirred.

In the case of using a liquid heated to a temperature higher than the boiling point of the solvent, the solvent is evaporated when the resin solution is mixed with the liquid. The evaporated solvent is cooled later for recovery of the solvent.

Accordingly, provided a suitable solvent and a suitable liquid are selected in accordance with the present invention, a resin can be regenerated while allowing recycling of the solvent by an extremely simple method, and without requiring large-scale equipment or high energy. The present invention can thus contribute significantly to reprocessing of industrial waste and conservation of limited resources.

The present invention will now be described by way of its examples.

EXAMPLE 1

Three hundred grams of pieces of a waste polystyrene foam box for containing fish were dissolved in 1 kg of methylene chloride. After adding 1 kg of water to the solution, the resultant mixture was agitated by a magnetic stirrer. Then, the polystyrene in the solution was separated and recovered as a regenerated resin film at the surface of the water layer. The polystyrene resin had no specific odor and was confirmed to be regenerated as a polystyrene resin by means of infrared spectrophotometry. When a foamed body was prepared using this regenerated resin, a foamed body identical to that obtained using a new polystyrene resin was obtained.

EXAMPLE 2

Three hundred grams of pieces of a used polycarbonate cup were dissolved in 1 kg of trichloroethylene. After adding 1 kg of water, the resultant mixture was agitated using a magnetic stirrer. Then, a polycarbonate in the resin solution was separated and regenerated in a film form at the surface of the water layer.

Infrared spectrophotometry confirmed that a polycarbonate resin had been regenerated.

EXAMPLE 3

Three hundred grams of a developed monochrome film (cellulose triacetate) were dissolved in 1 kg of methylene chloride. After adding 1 kg of water to the solution, the resultant mixture was agitated with a magnetic stirrer. Then, the cellulose triacetate was regenerated and recovered in a film form at the surface of the water layer.

EXAMPLE 4

One kilogram of crushed waste polystyrene foam box for fish was dissolved in 3 kg of methylene chloride to prepare a resin solution. The resin solution was slowly put in a warm water bath maintained at 70° C., with the result that the methylene chloride was released into the air and polystyrene was recovered as a regenerated resin film from the warm water surface. The recovered polystyrene film was pelletized by an extruder. Infrared spectroscopic analysis of the extruded pellet indicated that the waste polystyrene foam had been regenerated as satisfactory polystyrene resin. Further, polystyrene foam was newly produced by using the recovered polystyrene resin. The resultant foam was found substantially equal in properties to a foam produced by using fresh polystyrene resin.

The gas phase evaporated from the warm water surface was introduced into a distillation apparatus to recover 2.7 kg of methylene chloride.

EXAMPLE 5

A resin solution was prepared by dissolving 1 kg of crushed waste polystyrene foam box for an electric appliance in 2.5 kg of methylene chloride. The solution was slowly put in a warm water bath maintained at 80° C., with the result that the methylene chloride was evaporated into the air and polystyrene was recovered as a regenerated resin film from the warm water surface. The recovered resin film was pelletized by an extruder. Infra-red spectroscopic analysis of the extruded pellet indicated that the waste foam had been regenerated as a satisfactory polystyrene resin.

The gas phase evaporated from the warm water surface was introduced into a distillation apparatus to recover 2.2 kg of methylene chloride.

In summary, according to the present invention, a resin can be regenerated from any type of waste resin at low cost and by a simple method. Thus, the present invention provides a revolutionary process for regenerating a resin and for more effectively utilizing limited resources.

What is claimed is:

1. A process for regenerating a resin from substantially water insoluble waste resin which has a lower specific gravity than water, comprising:

dissolving such a waste resin in an organic solvent which is immiscible with water and which has a larger specific gravity than water to provide a resin solution;

admixing water with said resin solution thereby precipitating the resin in the solution in the form of resin particles and forming a stratified liquid having a lower layer of said organic solvent with a water layer on top of said organic solvent and said precipitated resin particles floating on said water layer, said water being at a temperature below the boiling point of said organic solvent; and recovering said resin particles from said water layer.

2. A process according to claim 1, wherein the solvent is a member selected from the group consisting of methylene chloride, trichloroethylene, and carbon tetrachloride.

3. A process according to claim 1, wherein the waste resin contains polystyrene resin.

* * * * *